(12) United States Patent
Aoki et al.

(10) Patent No.: US 10,095,607 B2
(45) Date of Patent: Oct. 9, 2018

(54) INFORMATION PROCESSING DEVICE, COMPUTER PROGRAM PRODUCT, AND TESTING SYSTEM WITH ACQUIRING TOTAL EXECUTION HISTORY

(71) Applicant: KABUSHIKI KAISHA TOSHIBA, Minato-ku (JP)

(72) Inventors: Satoshi Aoki, Fuchu (JP); Fukutomo Nakanishi, Sumida (JP); Hiroyoshi Haruki, Kawasaki (JP); Fangming Zhao, Fuchu (JP); Tatsuyuki Matsushita, Nerima (JP); Toshinari Takahashi, Ota (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/389,661

(22) Filed: Dec. 23, 2016

(65) Prior Publication Data
US 2017/0270033 A1    Sep. 21, 2017

(30) Foreign Application Priority Data
Mar. 17, 2016   (JP) ................. 2016-054536

(51) Int. Cl.
G06F 9/44         (2018.01)
G06F 11/36        (2006.01)

(52) U.S. Cl.
CPC ................ *G06F 11/3676* (2013.01)

(58) Field of Classification Search
CPC ................................. G06F 11/3676
(Continued)

(56) References Cited

U.S. PATENT DOCUMENTS 5,819,094 A * 10/1998 Sato ............... G06F 11/323
                                                714/E11.181
6,071,317 A *  6/2000 Nagel ............... G06F 8/78
                                                717/128
(Continued)

FOREIGN PATENT DOCUMENTS

JP     63-247842 A    10/1988
JP    2001-92873 A     4/2001
(Continued)

OTHER PUBLICATIONS

Akgul et al, "Assembly Instruction Level Reverse Execution for Debugging", ACM Transactions on Software Engineering and Methodology, vol. 13, No. 2, pp. 149-198, 2004.*
(Continued)

*Primary Examiner* — Anil Khatri
(74) *Attorney, Agent, or Firm* — Oblon, McClelland, Maier & Neustadt, L.L.P.

(57) ABSTRACT

A condition determination device includes an acquiring unit, a specifying unit, a classifying unit, and a condition determining unit. The acquiring unit acquires a total execution history, which is an execution count for each component included in a program, when a test is performed by supplying a plurality of input data to a target device which executes the program. The specifying unit specifies a shortage component of which the execution count indicated by the total execution history does not satisfy test criteria among components included in the program. The classifying unit classifies each of the input data into first data, which causes the target device to execute the shortage component, and second data, which does not cause the target device to execute the shortage component. The condition determining unit determines a condition of input data having a common characteristic with the first data.

20 Claims, 11 Drawing Sheets

(58) Field of Classification Search
USPC .................................................. 717/123–131
See application file for complete search history.

(56) References Cited

U.S. PATENT DOCUMENTS

| | | | | |
|---|---|---|---|---|
| 6,141,791 | A * | 10/2000 | Takuma | G06F 11/3624 712/227 |
| 6,701,514 | B1 * | 3/2004 | Haswell | G06F 11/3664 707/999.102 |
| 6,907,546 | B1 * | 6/2005 | Haswell | G06F 11/3684 714/38.11 |
| 6,941,545 | B1 * | 9/2005 | Reese | G06F 9/45554 711/206 |
| 6,957,422 | B2 * | 10/2005 | Hunt | G06F 8/443 714/E11.209 |
| 6,978,445 | B2 * | 12/2005 | Laane | G06F 17/30899 707/E17.119 |
| 7,937,685 | B2 * | 5/2011 | Weil | G06F 8/71 705/323 |
| 8,413,122 | B2 * | 4/2013 | Dragicevic | G06F 11/3636 717/126 |
| 8,443,341 | B2 * | 5/2013 | Berg | G06F 11/3616 717/131 |
| 8,448,140 | B2 * | 5/2013 | Isshiki | G06F 11/3419 717/124 |
| 8,464,224 | B2 * | 6/2013 | Dulip | G06F 11/3419 717/128 |
| 8,539,455 | B2 * | 9/2013 | Berg | G06F 11/3447 711/147 |
| 8,607,198 | B2 * | 12/2013 | Nir-Buchbinder | G06F 11/3676 717/124 |
| 8,924,942 | B1 * | 12/2014 | Makuch | G06F 9/44 715/762 |
| 8,935,673 | B1 * | 1/2015 | Ashkenazi | G06F 11/3636 702/186 |
| 9,501,385 | B2 * | 11/2016 | Eilam | G06F 11/3688 |
| 2001/0027539 | A1 | 10/2001 | Nozuyama | |
| 2017/0075784 | A1 | 3/2017 | Nakanishi et al. | |

FOREIGN PATENT DOCUMENTS

| | | |
|---|---|---|
| JP | 2001-273160 A | 10/2001 |
| JP | 2008-71075 A | 3/2008 |
| JP | 2010-267209 A | 11/2010 |
| JP | 2014-182451 A | 9/2014 |
| JP | 2017-58838 A | 3/2017 |
| JP | 2017-167937 A | 9/2017 |

OTHER PUBLICATIONS

Zhang et al, "Matching Execution Histories of Program Versions", ACM, pp. 197-206.*

Chakraborty et al, "Implementation of Execution History in Non-relational Databases for Feedback-guided Job Modeling" ACM, pp. 476-482, 2012.*

Okie et al, "The Execution History Approach to Intelligent Debugging", ACM, pp. 273-281, 1988.*

Schmidt et al, "Hierarchical Task Instance Mining in Interaction Histories", ACM, pp. 99-1-6, 2011.*

Klm et al, "A History-Based Test Prioritization Technique for Regression Testing in Resource Constrained Environments", ACM, pp. 119-129, 2002.*

Satoshi Aoki et al., "Fuzzing Method for Improving Test Density using the Execution Degree of Source Code", Computer Security Symposium 2016, vol. 2, Oct. 2016, pp. 106-113 (with English abstract and unedited computer generated English translation).

* cited by examiner

FIG.4

INPUT DATA (IDENTIFICATION INFORMATION)

| PARAMETER #1 (VERSION) | PARAMETER #2 (HEADER LENGTH) | PARAMETER #3 (TYPE) | ... |
|---|---|---|---|

FIG.5A
INDIVIDUAL EXECUTION HISTORY

| POSITION | | | EXECUTION COUNT |
|---|---|---|---|
| DIRECTORY NAME | FILE NAME | LINE NUMBER | |
| A | aaa.c | 01 | 3 |
| A | aaa.c | 02 | 3 |
| ⋮ | ⋮ | ⋮ | ⋮ |

FIG.5B
INDIVIDUAL EXECUTION HISTORY

| POSITION | | | EXECUTION COUNT |
|---|---|---|---|
| DIRECTORY NAME | FILE NAME | LINE NUMBER | |
| A | aaa.c | 01 | 1 |
| A | aaa.c | 02 | 0 |
| ⋮ | ⋮ | ⋮ | ⋮ |

FIG.5C
INDIVIDUAL EXECUTION HISTORY

| POSITION | | | EXECUTION COUNT |
|---|---|---|---|
| DIRECTORY NAME | FILE NAME | LINE NUMBER | |
| A | aaa.c | 01 | 10 |
| A | aaa.c | 02 | 0 |
| ⋮ | ⋮ | ⋮ | ⋮ |

FIG.5D
TOTAL EXECUTION HISTORY

| POSITION | | | EXECUTION COUNT |
|---|---|---|---|
| DIRECTORY NAME | FILE NAME | LINE NUMBER | |
| A | aaa.c | 01 | 14 |
| A | aaa.c | 02 | 3 |
| ⋮ | ⋮ | ⋮ | ⋮ |

FIG.6

```
TEST CRITERIA

PASS CONDITION: EXECUTION COUNT N≥5
```

FIG.7

| IDENTIFIER OF INPUT DATA | PARAMETER | | | | EXECUTED-OR-UNEXECUTED |
|---|---|---|---|---|---|
| | PARAMETER #1 (VERSION) | PARAMETER #2 (HEADER LENGTH) | PARAMETER #3 (TYPE) | ... | |
| 0001 | XXXX | XXXX | XXXX | | TRUE |
| 0002 | XXXX | XXXX | XXXX | | FALSE |
| 0003 | XXXX | XXXX | XXXX | ... | TRUE |
| 0004 | XXXX | XXXX | XXXX | | FALSE |
| ⋮ | ⋮ | ⋮ | ⋮ | | ⋮ |

INFORMATION PROCESSING DEVICE, COMPUTER PROGRAM PRODUCT, AND TESTING SYSTEM WITH ACQUIRING TOTAL EXECUTION HISTORY

CROSS-REFERENCE TO RELATED APPLICATIONS

This application is based upon and claims the benefit of priority from Japanese Patent Application No. 2016-054536, filed on Mar. 17, 2016; the entire contents of which are incorporated herein by reference.

FIELD

An embodiment described herein relates to an information processing device, a computer program product and a test system.

BACKGROUND

There is a method called fuzzing as one of methods of detecting unknown vulnerability included in a program and a target device that executes the program. In the fuzzing, a test device supplies a large amount of various kinds of random data to a target device, and monitors responses from the target device and behaviors of the target device. Further, the test device detects the vulnerability based on the obtained responses and behaviors.

However, a large amount of data is randomly selected in the fuzzing, and thus, there is a case in which unevenness occurs in components of a program to be executed by the target device during the test. For example, there is a case in which a function X is executed for 100 times or more while a function Y is executed only once. When such unevenness occurs in the components executed during the test, the developed program has vulnerability, and some components thereof are not sufficiently tested.

It may be configured such that data covering the entire combination is generated, the entire generated data is supplied to a target device, and responses and behaviors thereof are monitored during test in order to prevent unevenness from occurring in components of a program to be executed during the test by the target device. However, such a method is not practical as data to be supplied is enormous, and the test time increases.

A problem to be solved by the embodiment described herein is to determine a condition of input data that enables a target device to execute an insufficiently tested component included in a program.

BRIEF DESCRIPTION OF THE DRAWINGS

FIG. 4 is a diagram illustrating an example of a parameter indicating an attribute of input data;

FIGS. 5A to 5D are diagrams illustrating examples of a plurality of individual execution histories and the total execution history;

FIG. 6 is a diagram illustrating an example of test criteria;

FIG. 7 is a diagram illustrating an example of executed-or-unexecuted data information;

DETAILED DESCRIPTION

An information processing device according to one embodiment includes one or more processors. The processors acquire a total execution history, which is an execution history for each component included in a program, when a test is performed by supplying a plurality of input data to a target device which executes the program, and specify a shortage component of which the total execution history does not satisfy test criteria among plural components included in the program. The processors classify each of the plurality of input data into first data, which causes the target device to execute the shortage component, and second data, which does not cause the target device to execute the shortage component. The processors determine a condition of input data having a common characteristic with the first data.

Hereinafter, embodiments will be described in detail with reference to the appended drawings.

First Embodiment

Figure 1:
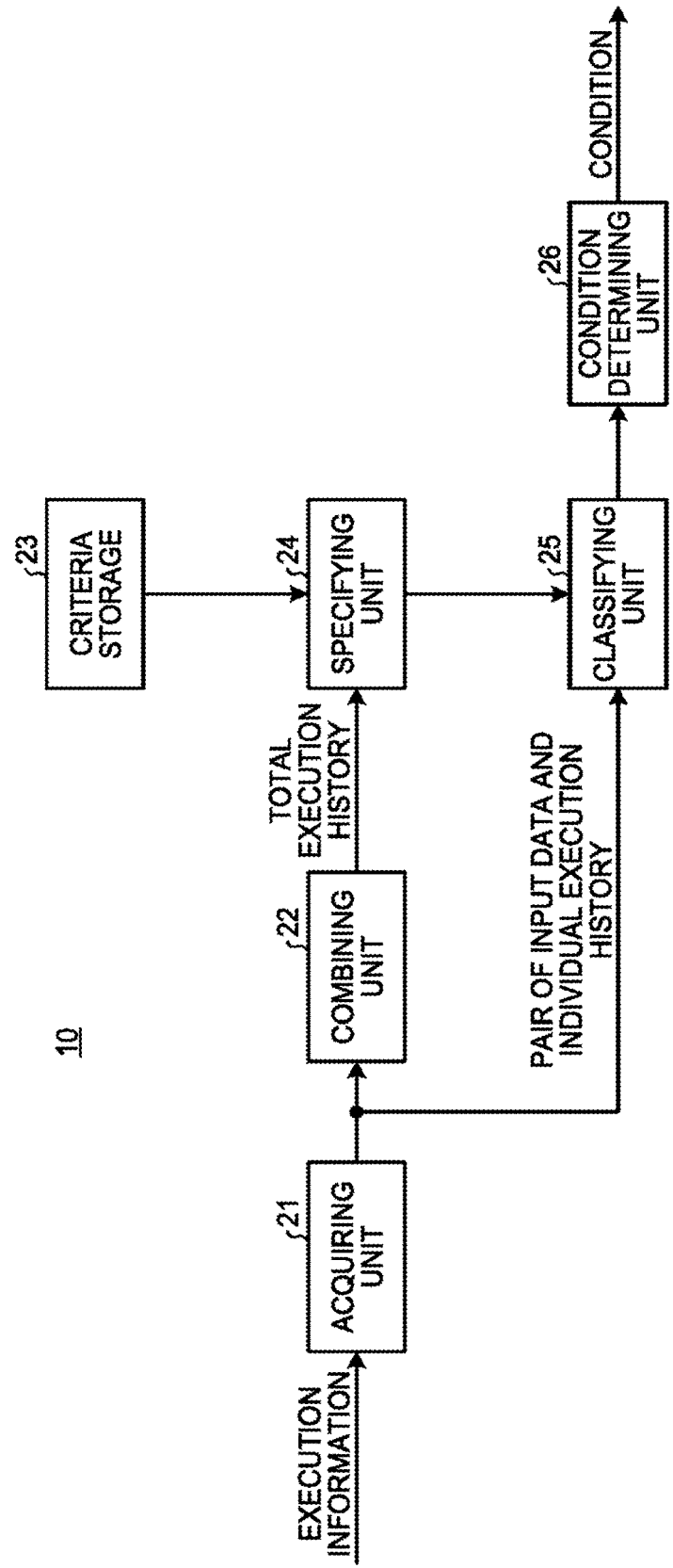
FIG. 1 is a configuration diagram of a condition determination device according to a first embodiment.

FIG. 1 is a diagram illustrating a configuration of a condition determination device 10 according to a first embodiment. The condition determination device 10 determines a condition of input data that needs to be supplied to a target device in the case of performing a test by supplying a plurality of the input data to the target device that executes a program. The condition thus generated is supplied to a test device, which tests the target device, and is used for generation of the input data, for example.

The condition determination device 10 includes an acquiring unit 21, a combining unit 22, criteria storage 23, a specifying unit 24, a classifying unit 25, and a condition determining unit 26.

The acquiring unit 21 acquires execution information. The execution information represents a pair of input data and an individual execution history for each of the plurality of input data which is supplied to the target device from the test device in the past test. The individual execution history is an execution history for each component included in the program in the case of supplying the corresponding input data to the target device. Incidentally, the component included in the program, the execution information, the input data, and the individual execution history will be described again with reference to FIGS. 2 to 5.

The combining unit 22 receives the plurality of individual execution histories indicated in the execution information. The combining unit 22 combines the plurality of individual execution histories indicated in the execution information and generates the total execution history. The total execution history is an execution history for each component included in the program when the test device tests the target device by supplying the plurality of input data thereto. That is, the individual execution history is the execution history for each component in the case of supplying one input data to the target device while the total execution history is the execution history for each component in the case of supplying the plurality of input data to the target device. Incidentally, the total execution history will be described again with reference to FIGS. 5A to 5D.

The criteria storage 23 stores test criteria. The test criteria are a condition which is configured to determine whether each component included in the program is sufficiently executed during the test to a level of being determined to have no vulnerability. The test criteria will be described again with reference to FIG. 6.

The specifying unit 24 acquires the total execution history from the combining unit 22. In addition, the specifying unit 24 reads the test criteria from the criteria storage 23. The specifying unit 24 specifies a shortage component of which the total execution history does not satisfy the test criteria among the plurality of components included in the program to be executed by the target device.

The classifying unit 25 receives the shortage component specified by the specifying unit 24. In addition, the classifying unit 25 acquires each pair of the input data and the individual execution history, included in the execution information acquired by the acquiring unit 21, of all the plurality of input data.

The classifying unit 25 classifies each of the plurality of input data into data (executed data) that has caused the target device to execute the shortage component and data (unexecuted data) that has not caused the target device to execute the shortage component. To be specific, the classifying unit 25 determines whether the shortage component has been executed for each of the plurality of input data by referring to each individual execution history forming the pair. When the individual execution history forming the pair indicates that the shortage component has been executed, the classifying unit 25 sets the input data thereof as the data (executed data) that has caused the target device to execute the shortage component. In addition, when the individual execution history forming the pair does not indicate that the shortage component has been executed, the classifying unit 25 sets the input data thereof as the data (unexecuted data) that has not caused the target device to execute the shortage component.

Incidentally, the classifying unit 25 may further generate executed-or-unexecuted data information. The executed-or-unexecuted data information is information that indicates a parameter and the discrimination on whether the shortage component has been executed for each of the plurality of input data. The executed-or-unexecuted data information will be described again with reference to FIG. 7.

The condition determining unit 26 determines a condition of the input data having the common characteristic with the data (executed data) that has caused the target device to execute the shortage component. For example, the condition determining unit 26 determines the condition of the input data having the common characteristic with the executed data based on a relationship between the data (executed data) that has caused the target device to execute the shortage component and the data (unexecuted data) that has not caused the target device to execute the shortage component. A method of determining the condition will be described again with reference to FIG. 8.

The condition determination device 10 outputs the condition determined in this manner to the test device, for example.

Figures 2, 3:
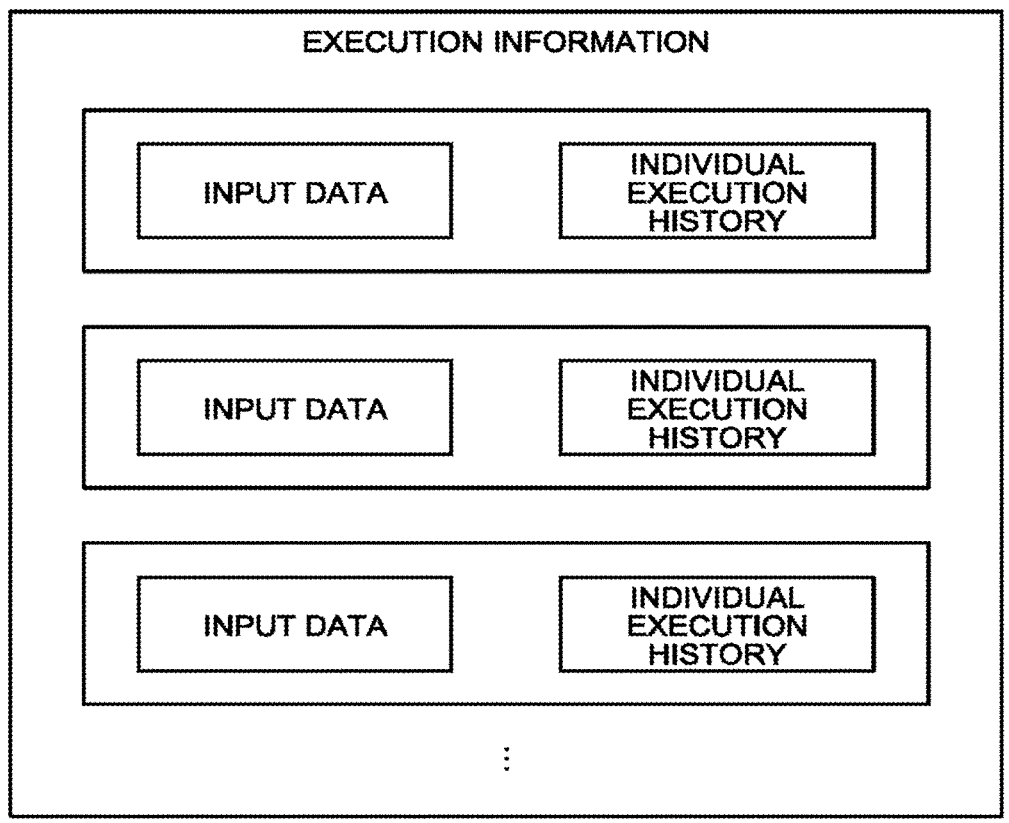
FIG. 2 is a diagram illustrating an example of a program which is executed by a target device.
FIG. 3 is a diagram illustrating an example of a configuration of execution information.

FIG. 2 is a diagram illustrating an example of a program which is executed by the target device. The target device includes a processor and a memory and has a function of executing the program.

The program includes a plurality of statements. The processor of the target device executes processing following the program by sequentially executing the statements included in the program.

Each position of the statements is specified by, for example, a line number, a directory name, and a file name. The line number indicates a relative position of the statement in the program. The directory name indicates a name of a directory in which the program is stored. The file name is a name of the program.

The component included in the program is a part forming the program. In the present embodiment, the component is the statement. The statement is a code obtained by dividing the program in the unit of lines, and the position thereof is specified by the directory name, the file name, and the line number. Incidentally, the component is not limited to the statement, and may be, for example, a function, and a subroutine or a file in which the certain number of codes are collected.

FIG. 3 is a diagram illustrating an example of a configuration of the execution information. The execution information includes a plurality of the pairs of the input data and the individual execution history. Each of the plurality of input data included in the execution information is data that is supplied to the target device from the test device in the past test. The individual execution history is the execution history for each component included in the program of the target device when the input data forming the pair is supplied to the target device.

The acquiring unit 21 acquires such execution information from execution information storage provided on the outside. The execution information storage can inform portions of the plurality of components included in the program that have been executed and the execution histories in relation to each input data by keeping the input data and the individual execution history as the pair. In addition, the execution information storage keeps the execution history for each input data in an independent manner, and thus, enables analysis of a correspondence relationship between an attribute of the input data and the executed portion of the program for each input data.

FIG. 4 is a diagram illustrating an example of the parameter indicating the attribute of the input data. The input data supplied from the test device to the target device is different depending on a function of the target device and content of a test. For example, when the target device is a device that performs communication via a network, the input data is a packet following a communication protocol, for example. In addition, when the target device is an image processing device, the input data is image data, for example. In addition, when the target device is a device that responds to a supplied input variable, the input data is the input variable.

In the present embodiment, an identifier is allocated to the input data. The condition determination device 10 can specify the input data from the identifier.

In addition, the attribute of the input data is indicated by the plurality of parameters in the present embodiment. The input data is determined by specifying each value of the parameters. The input data as the packet for communication include, for example, a version (parameter #1), a header length (parameter #2), a type (parameter #3), and the like as the parameters.

FIGS. 5A to 5D are diagrams illustrating examples of the plurality of individual execution histories and the total execution history. The execution history is a log for each component that indicates a count and time of execution of each component included in the program performed by the target device.

In the present embodiment, the individual execution history is an execution count of the corresponding statement performed by the target device when the single input data is supplied to the target device. Accordingly, the individual execution history is indicated by each execution count of each position (the directory name, the file name, and the line number) of the statements when the single input data is supplied to the target device as illustrated in FIGS. 5A to 5C.

In addition, the total execution history is a total execution count of the corresponding statements performed by the target device when the plurality of input data is supplied to the target device in the present embodiment. Accordingly, the total execution history is indicated by each execution count of each position of the statements when the plurality of input data is supplied to the target device as illustrated in FIG. 5D.

In the present embodiment, the combining unit 22 generates the total execution history by acquiring the execution count of the corresponding position from each of the plurality of individual execution histories for each statement included in the program and adding up the acquired plurality of execution counts. For example, the combining unit 22 adds up an execution count "3" of an individual execution history A, an execution count "1" of an individual execution history B, and an execution count "10" of an individual execution history C for a statement having a line number "01" in FIGS. 5A to 5D, and calculates an execution count "14" of a total execution history D. In addition, for example, the combining unit 22 adds up an execution count "3" of the individual execution history A, an execution count "0" of the individual execution history B, and an execution count "0" of the individual execution history C for a statement having a line number "02" in FIGS. 5A to 5D, and calculates an execution count "3" of the total execution history D.

FIG. 6 is a diagram illustrating an example of the test criteria. The test criteria are the conditions which are configured to determine whether each component included in the program is sufficiently executed during the test to the level of being determined to have no vulnerability. The test criteria are indicated by a conditional expression using the total execution history or the like.

In the present embodiment, the test criteria are indicated by a conditional expression using the execution count. To be specific, the test criteria represent a pass when the total execution history is equal to or larger than a set value (for example, five times).

The specifying unit 24 determines whether the execution count represented by the total execution history satisfies the test criteria for each statement included in the program. The specifying unit 24 specifies a statement of which an execution count represented by a total execution history does not satisfy the test criteria among the plurality of statements included in the program as the shortage component. In the example of FIG. 6, the specifying unit 24 specifies a statement of which an execution count represented by a total execution history is not equal to or larger than five times (that is, a statement of which an execution count is smaller than five times) as the shortage component. Accordingly, the specifying unit 24 can specify the component (for example, the statement) that has not been sufficiently executed in the test.

FIG. 7 is a diagram illustrating an example of the executed-or-unexecuted data information. The classifying unit 25 classifies each of the plurality of input data into the data (executed data) that has caused the target device to execute the shortage component and the data (unexecuted data) that has not caused the target device to execute the shortage component.

In the present embodiment, the classifying unit 25 determines whether the shortage component has been executed for each of the plurality of input data by referring to the execution count at the position of the shortage component in each individual execution history forming the pair. For example, when the shortage component is the statement having the line number "01", the classifying unit 25 determines that the corresponding input data has caused execution of the shortage component if the execution count is equal to or larger than once by referring to the execution count of the statement in the individual execution history having the line number "01", and determines that the corresponding input data has not caused execution of the shortage component if the execution count is zero.

The classifying unit 25 performs the above-described classification for each of the plurality of components included in the program, and then, generates the executed-or-unexecuted data information as illustrated in FIG. 7. The executed-or-unexecuted data information includes information that indicates the discrimination on whether the shortage component has been executed (true) or the shortage component has not been executed (false) for each of the plurality of input data.

Further, the executed-or-unexecuted data information may include the identifier and the plurality of parameter values for each of the plurality of input data. Such executed-or-unexecuted data information can facilitate analysis of each attribute of the input data that has caused the execution of the shortage component and the input data that has not caused the execution of the shortage component.

Figure 8:
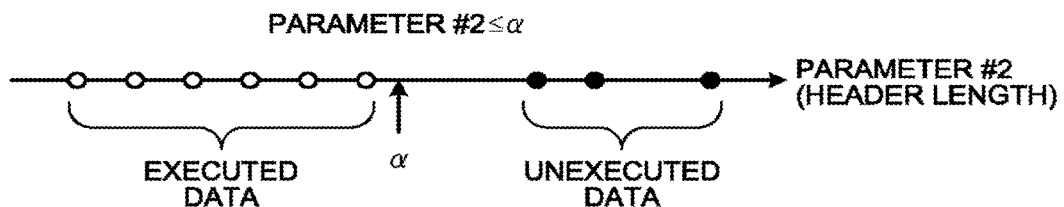
FIG. 8 is a diagram illustrating an example of a boundary value between executed data and unexecuted data.

FIG. 8 is a diagram illustrating an example of a boundary value between the executed data and the unexecuted data regarding a certain parameter (the parameter #2). For example, the condition determining unit 26 determines the condition of the input data having the common characteristic with the data that has caused the target device to execute the shortage component based on the relationship between the data that has caused the target device to execute the shortage component and the data that has not caused the target device to execute the shortage component.

For example, the condition determining unit 26 determines a condition of a parameter indicating a property of a set of the data (executed data) that has caused the target device to execute the shortage component. To be more specific, the condition determining unit 26 determines the boundary value between the data (executed data) that has caused the target device to execute the shortage component and the data (unexecuted data) that has not caused the target device to execute the shortage component for any of the parameters. Further, the condition determining unit 26 determines the condition of the input data for a parameter based on the boundary value of the parameter.

For example, the parameter #2 (header length) of the set of the executed data is equal to or smaller than a, and the parameter #2 (header length) of the set of the unexecuted data is larger than a in the example of FIG. 8. Accordingly, the condition determining unit 26 determines the parameter

2 (header length) which is equal to or smaller than a as the condition of the input data in such a case.

In addition, the condition determining unit 26 may determine the condition of the input data having the common characteristic with the data that has caused the target device to execute the shortage component by data mining. For example, the condition determining unit 26 may determine the condition using a general-purpose data mining tool (software). Incidentally, the data mining in this specification is a technique of extracting knowledge by comprehensively applying a data analysis technique such as statistics, pattern recognition, and artificial intelligence to a large amount of data, and examples thereof may include correlation analysis, regression analysis, classification, clustering, and the like.

In addition, the condition determining unit 26 may determine the condition of the input data for each of the plurality of parameters. Further, the condition determining unit 26 may determine the condition which is indicated by a function having two or more parameters as variables or the like when there is a correlation between two or more parameter values.

Figure 9:
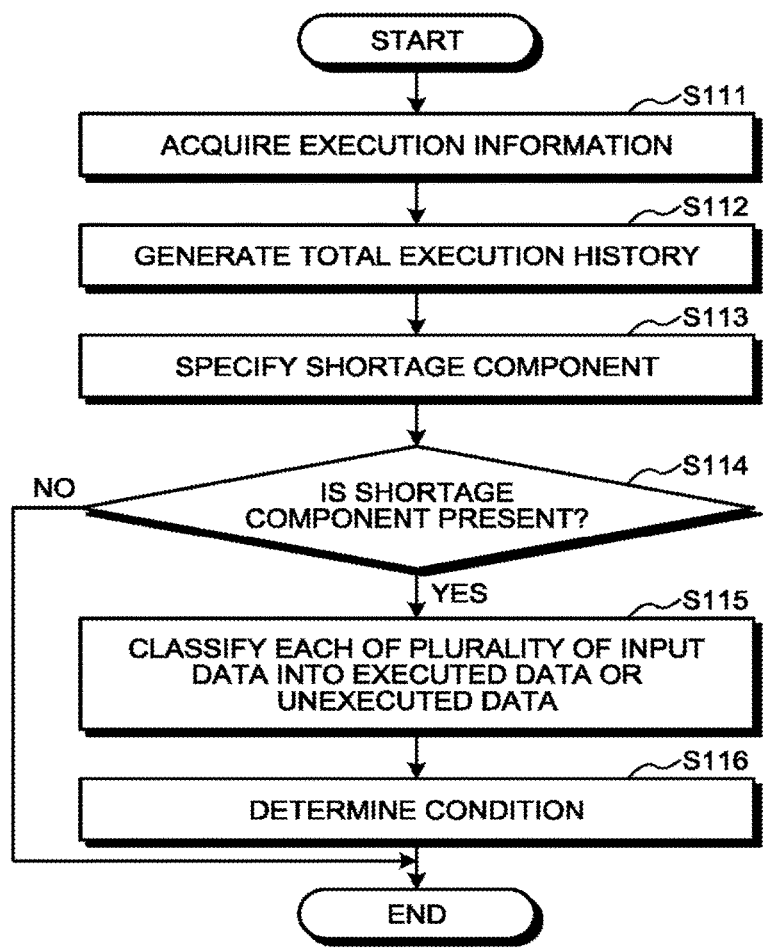
FIG. 9 is a diagram illustrating a processing flow of the condition determination device according to the first embodiment.

FIG. 9 is a diagram illustrating a processing flow of the condition determination device 10 according to the first embodiment. After the test device performs the test by supplying the plurality of input data to the target device, the condition determination device 10 executes the processing from S111.

First, the acquiring unit 21 acquires the execution information from the execution information storage in S111. The execution information is information that represents the pair of the input data and the individual execution history for each of the plurality of input data supplied to the target device from the test device. Herein, the individual execution history indicates the execution count for each of the plurality of statements included in the program when the corresponding input data is supplied to the target device.

Subsequently, the combining unit 22 combines the plurality of individual execution histories included in the execution information and generates the total execution history in S112. The combining unit 22 acquires the execution count at the corresponding position from each of the plurality of individual execution histories for each statement included in the program, for example. Further, the combining unit 22 generates the total execution history by adding up the plurality of acquired execution counts for each statement included in the program.

Subsequently, the specifying unit 24 specifies a shortage component of which the total execution history does not satisfy the test criteria among the plurality of components included in the program to be executed by the target device in S113. For example, the specifying unit 24 determines whether the execution count represented by the total execution history satisfies the test criteria for each statement included in the program. Further, the specifying unit 24 specifies the statement of which the execution count represented by the total execution history does not satisfy the test criteria among the plurality of statements included in the program as the shortage component.

Incidentally, the specifying unit 24 does not necessarily specify the component (statement) having the execution count of zero as the shortage component in this case. There is no input data, selected as the executed data in S115 to be described later, for the component having the execution count of zero, and the condition thereof is not determined. Accordingly, the specifying unit 24 does not specify the component having the execution count of zero as the shortage component, and thus, it is possible to avoid an error caused when the condition is not determined.

Subsequently, the specifying unit 24 determines whether the shortage component is present in S114. The specifying unit 24 ends the present flow when the shortage component is not present (No in S114).

When the shortage component is present (Yes in S114), the specifying unit 24 causes the processing to proceed to S115. Incidentally, when the plurality of shortage components are present, the specifying unit 24 executes processes of S115 and the subsequent steps for each of the plurality of shortage components. In addition, when the plurality of shortage components are present, the specifying unit 24 may grant a priority to each of the plurality of shortage components and execute the processes of S115 and the subsequent steps for some shortage components having the high priority.

Subsequently, the classifying unit 25 classifies each of the plurality of input data into data (executed data) that has caused the target device to execute the specified shortage component and data (unexecuted data) that has not caused the target device to execute the shortage component in S115. For example, the classifying unit 25 performs the classification by determining whether the shortage component has been executed for each of the plurality of input data by referring to each individual execution history. In this case, the classifying unit 25 may generate the executed-or-unexecuted data information.

Subsequently, the condition determining unit 26 determines the condition of the input data having the common characteristic with the executed data based on a relationship between the data (executed data) that has caused the target device to execute the shortage component and the data (unexecuted data) that has not caused the target device to execute the shortage component in S116.

For example, the condition determining unit 26 determines the condition of the parameter indicating the attribute of the set of the executed data. To be more specific, the condition determining unit 26 determines the boundary value between the executed data and the unexecuted data for any of the parameters. Further, the condition determining unit 26 determines the condition of the parameter based on the boundary value of the parameter.

As described above, the condition determination device 10 can determine the condition of the input data which can cause the target device to execute the component of which the execution history has not satisfied the test criteria in the test. That is, the condition determination device 10 can determine the condition of the input data that enables the target device to execute the insufficiently tested component included in the program.

Accordingly, the test device can increase the possibility of enabling the execution of the components of the program that have not satisfied the test criteria so far by supplying the input data that satisfies this condition to the target device. Accordingly, the test device can reduce the insufficiently tested components and reduce parts of the program having the vulnerability.

Second Embodiment

Next, a second embodiment will be described. Incidentally, the common matters with those of the first embodiment will be denoted by the common terms and will not be described.

Figure 10:
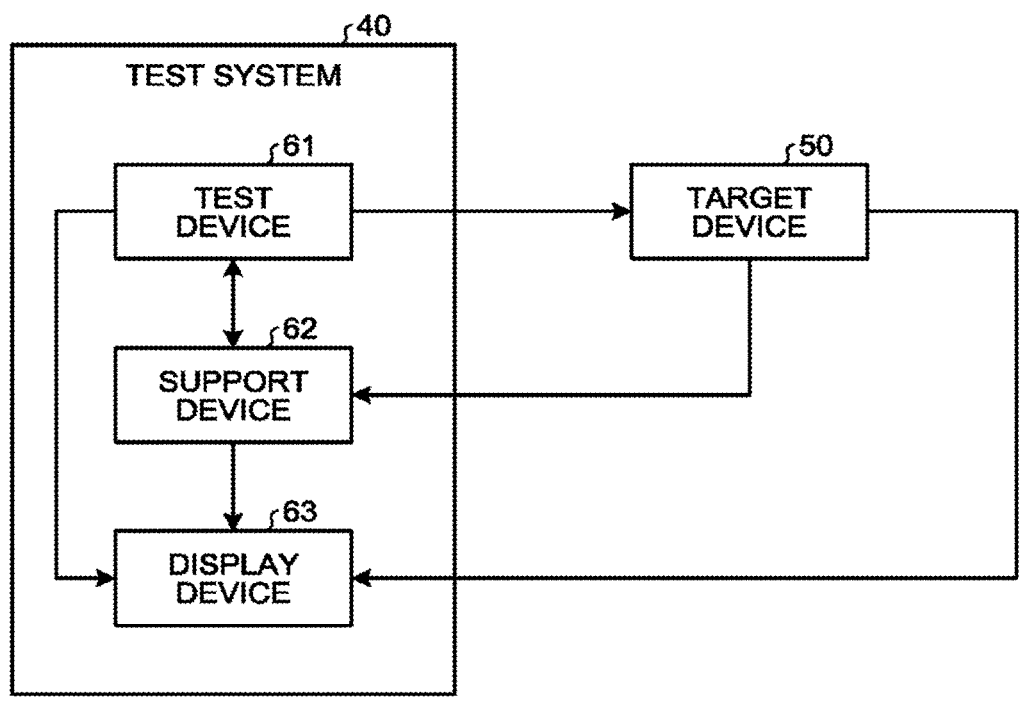
FIG. 10 is a configuration diagram of a test system according to a second embodiment.

FIG. 10 is a diagram illustrating a configuration of a test system 40 according to the second embodiment together with a target device 50. The test system 40 tests a program and the target device 50 by supplying a plurality of input data to the target device 50 that executes the program.

The target device 50 executes the program serving as a test target. The target device 50 includes a processor and a memory and has a function of executing the program.

The test system 40 includes a test device 61, a support device 62, and a display device 63. The test device 61 tests the target device 50 by supplying the plurality of input data to the target device 50. The target device 50 executes processing following the program using the input data supplied from the test device 61.

The support device 62 supports the processing performed by the test device 61. To be specific, the support device 62 determines a condition which is used to allow the test device 61 to generate the input data. The test device 61 generates the input data, which satisfies the condition determined by the support device 62, and supplies the generated input data to the target device 50.

The display device 63 displays various kinds of information used by the target device 50, the test device 61, and the support device 62.

Figure 11:
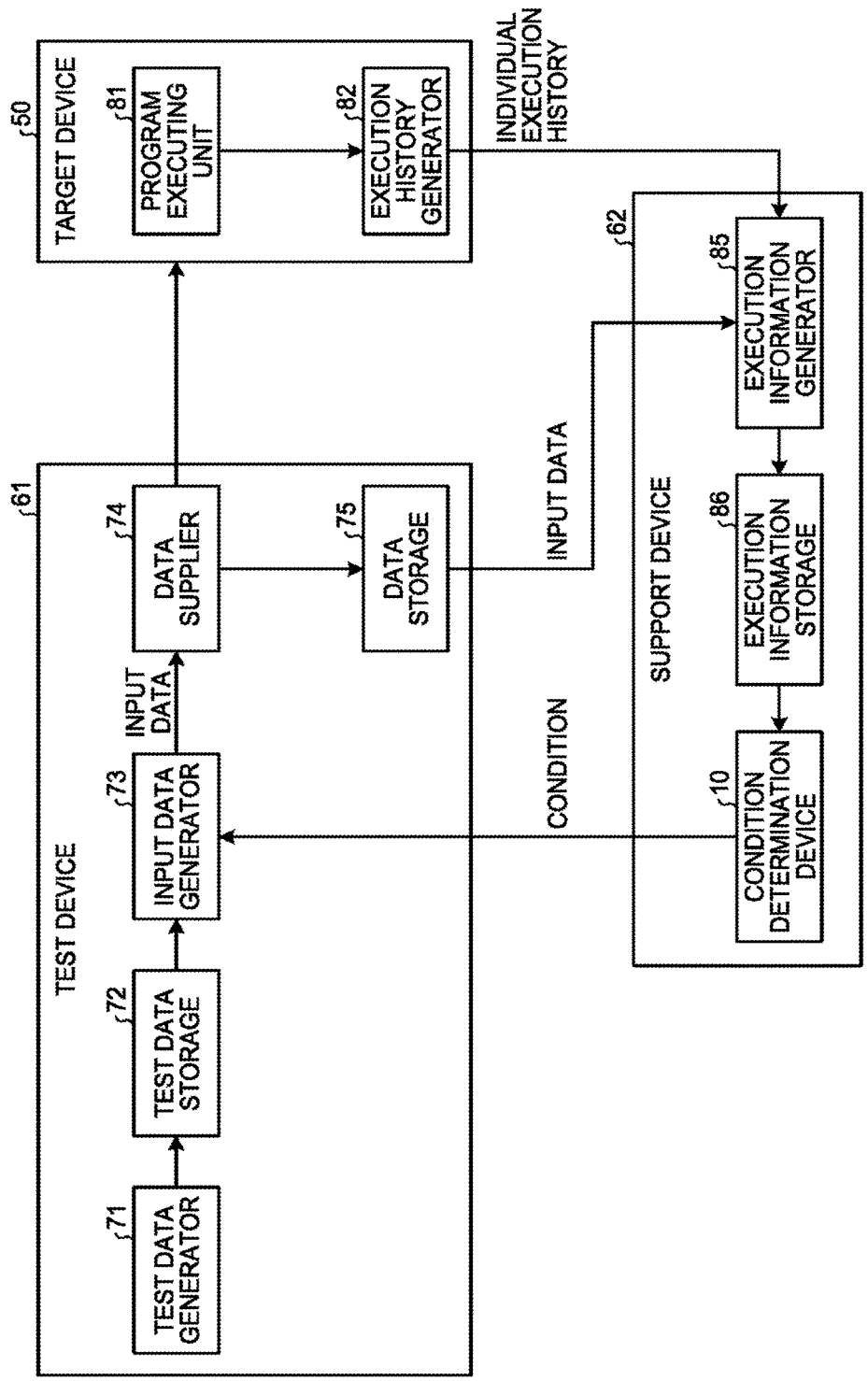
FIG. 11 is a configuration diagram of a target device, a test device, and a support device according to the second embodiment.

FIG. 11 is a diagram illustrating each configuration of the target device 50, the test device 61, and the support device 62 according to the second embodiment. The test device 61 includes a test data generator 71, test data storage 72, an input data generator 73, a data supplier 74, and data storage 75.

The test data generator 71 generates a test data group including a plurality of test data. The test data generator 71 generates the test data by displacing a part of normal data with which the normal operation of the target device 50 has been confirmed.

The test data storage 72 stores the test data group generated by the test data generator 71. The test data generator 71 generates the test data group and causes the generated test data group to be stored in the test data storage 72 prior to the test. Accordingly, the test data generator 71 does not necessarily generate the test data for each test, and a processing load is reduced.

Incidentally, the test data generator 71 may supply the generated test data group to the display device 63. The display device 63 displays the test data group acquired from the test data generator 71. Accordingly, the display device 63 can cause an operator to confirm the test data group.

The input data generator 73 generates each of the plurality of input data that needs to be supplied to the target device 50 based on the test data group stored in the test data storage 72.

In the present embodiment, the input data generator 73 randomly extracts test data from the test data group and outputs the extracted test data as the input data in the first test. In addition, the input data generator 73 extracts test data, which satisfies the condition received from the support device 62, from the test data group, and outputs the extracted test data as the input data in the second and subsequent tests.

In addition, the input data generator 73 generates the input data which does not overlap the input data that has been already supplied to the target device 50 in the second and subsequent tests. For example, the input data generator 73 extracts the input data, which does not overlap the input data that has been extracted in the previous tests, from the test data group in the second and subsequent tests. Accordingly, the input data generator 73 can avoid the test using the same input data.

Incidentally, the input data generator 73 may supply the generated plurality of input data to the display device 63. The display device 63 displays the plurality of input data acquired from the input data generator 73. Accordingly, the display device 63 can cause the operator to confirm the plurality of input data that needs to be supplied to the target device 50.

The data supplier 74 supplies each of the plurality of input data generated by the input data generator 73 to the target device 50, thereby testing the target device 50. The data storage 75 stores the plurality of input data supplied to the target device 50. The data storage 75 may store the plurality of input data for each test in the case of performing a plurality of times of tests.

The target device 50 includes a program executing unit 81 and an execution history generator 82. The program executing unit 81 is implemented by the processor that executes the program serving as the test target. The program executing unit 81 performs the processing following the program using the input data supplied from the test device 61 and outputs a result.

The program executing unit 81 may supply the processing result to the display device 63. The display device 63 displays the processing result acquired from the program executing unit 81. Accordingly, the display device 63 can cause the operator to confirm the processing result and use the same to debug the program, for example.

The execution history generator 82 implements, for example, the program serving as the test target by causing the processor to execute a code which has been compiled with an option to add the execution history output. For example, the execution history generator 82 implements the program serving as the test target by causing the processor to execute a compiled code with a coverage measurement option in the case of GCC (GNU Compiler Collection).

The execution history generator 82 detects an execution frequency (for example, the execution count for each statement) for each component included in the program when the test device 61 supplies the input data to the target device 50. Further, the execution history generator 82 outputs an individual execution history every time when the processing in response to the single input data ends.

The execution history generator 82 may supply the individual execution history to the display device 63. The display device 63 displays the individual execution history acquired from the execution history generator 82. Accordingly, the display device 63 can cause the operator to confirm the individual execution history.

The support device 62 includes execution information generator 85, execution information storage 86, and the condition determination device 10. The execution information generator 85 acquires the plurality of input data, which have been supplied to the target device 50, from the test device 61. In addition, the execution information generator 85 acquires the plurality of individual execution histories from the target device 50. The execution information generator 85 sets each of the plurality of input data and each corresponding individual execution history as a pair. Further, the execution information generator 85 generates execution information that includes the pair of the input data and the individual execution history for each of the plurality of input data.

The execution information generator 85 causes the generated execution information to be stored in the execution information storage 86. The execution information storage 86 stores the execution information generated by the execution information generator 85. In this case, the execution information storage 86 may store the execution information separately for each test.

The execution information generator 85 may supply the execution information to the display device 63. The display device 63 displays the execution information acquired from the execution information generator 85. Accordingly, the display device 63 can cause the operator to confirm the execution information.

The condition determination device 10 determines a condition of the input data that needs to be supplied to the target device 50 based on the execution information stored in the execution information storage 86. Further, the condition determination device 10 supplies the determined condition to the test device 61. The condition determination device 10 has the same function and configuration as those of the first embodiment, and thus, the detailed description thereof will be omitted.

The condition determination device 10 may supply all or any of the total execution history, the executed-or-unexecuted data information, and the determined condition to the display device 63. The display device 63 displays the total execution history, the executed-or-unexecuted data information, and the determined condition acquired from the condition determination device 10. Accordingly, the display device 63 can cause the operator to confirm the total execution history, the executed-or-unexecuted data information, and the determined condition.

Figure 12:
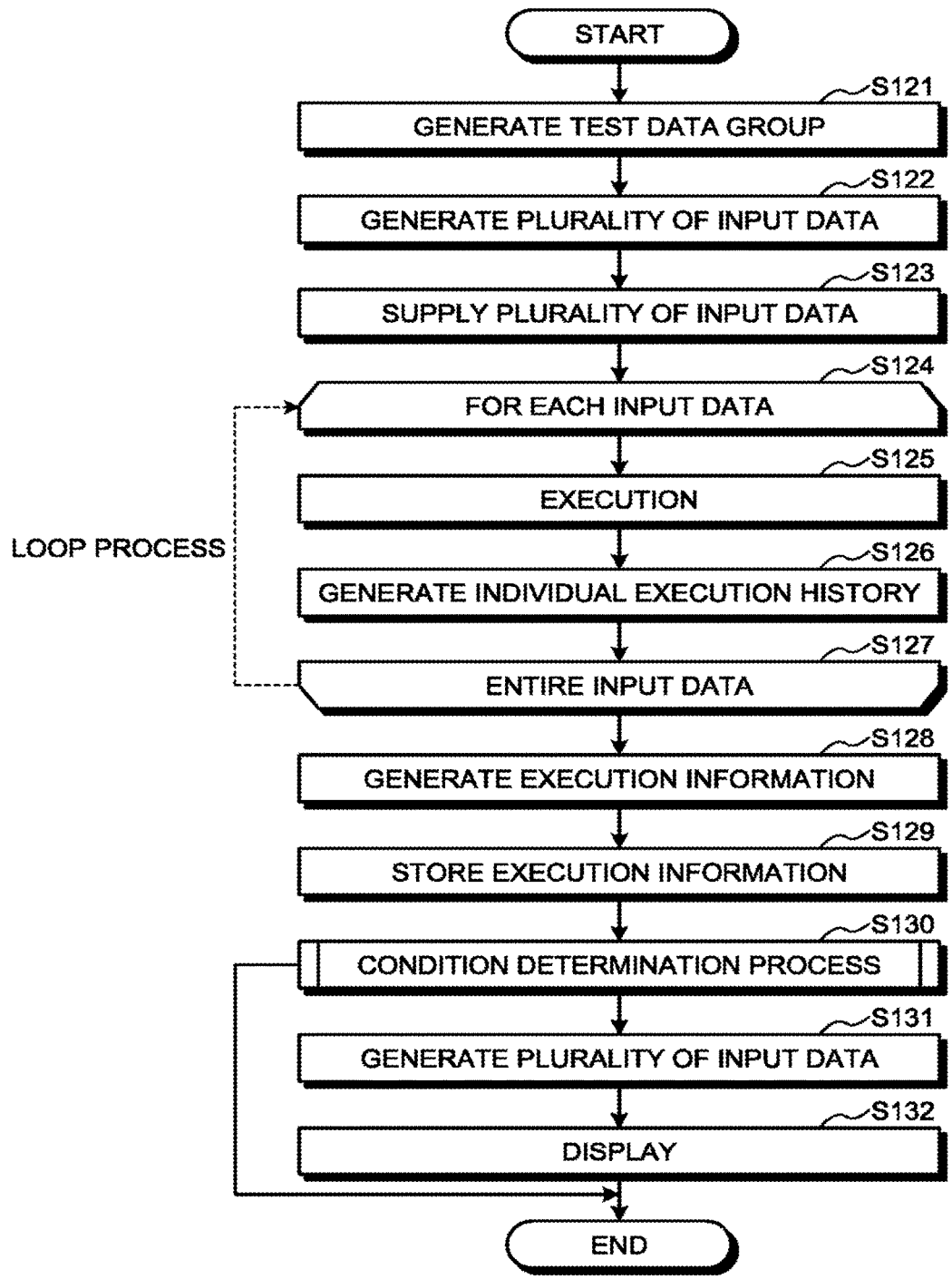
FIG. 12 is a diagram illustrating a processing flow of a test system according to the second embodiment.

FIG. 12 is a diagram illustrating a processing flow of the test system 40 according to the second embodiment. The test system 40 according to the present embodiment executes processing from S121 in the case of testing the target device 50.

First, the test data generator 71 generates the test data group which includes the plurality of test data in S121. The test data generator 71 may generate the test data group prior to the test and cause the generated test data group to be stored in the test data storage 72.

Subsequently, the input data generator 73 generates the plurality of input data based on the test data group in S122. In the present embodiment, the input data generator 73 randomly extracts test data from the test data group and outputs the extracted test data as the input data.

Subsequently, the data supplier 74 sequentially supplies each of the plurality of generated input data to the target device 50, and tests the target device 50 in S123.

The target device 50 executes processes of S125 and S126 every time when the input data is received (a loop process between S124 and S127). In S125, the target device 50 executes the processing following the program using the supplied input data. In S126, the target device 50 generates the individual execution history corresponding to the supplied input data. The target device 50 exits the loop process between S124 and S127 when the processes of S125 and S126 end for the entire input data.

Subsequently, the execution information generator 85 acquires the plurality of input data supplied from the test device 61 to the target device 50 and the plurality of individual execution histories generated by the target device 50 in S128. Further, the execution information generator 85 generates the execution information that includes the pair of the input data and the individual execution history for each of the plurality of input data.

Subsequently, the execution information storage 86 stores the generated execution information in S129.

Subsequently, the condition determination device 10 determines a new condition of the input data based on the execution information stored in the execution information storage 86 in S130. The process of S130 is the same as the process illustrated in FIG. 9, and thus, the detailed description thereof will be omitted. The condition determination device 10 supplies the generated condition to the input data generator 73. Incidentally, when the shortage component is not present (No in S114) in the processes within S130, the condition determination device 10 ends the present flow.

Subsequently, the input data generator 73 generates the plurality of input data that satisfy the condition determined by the condition determination device 10 in S131. In the present embodiment, the input data generator 73 extracts test data that satisfies the condition from the test data group and outputs the extracted test data as the input data. In this case, the input data generator 73 generates the plurality of input data that do not overlap the input data generated in S122.

Subsequently, the display device 63 displays the generated plurality of input data in S132.

As described above, the test system 40 according to the present embodiment can generate the input data having a high possibility of enabling the target device 50 to execute the component of which the execution history has not satisfied the test criteria in the test. That is, the test system 40 according to the present embodiment can generate the input data that enables the target device 50 to execute the insufficiently tested component included in the program.

Accordingly, the test system 40 can increase the possibility of enabling the execution of the components of the program that have not satisfied the test criteria so far by supplying the above-described input data to the target device 50. Accordingly, the test system 40 can reduce the insufficiently tested components and reduce parts of the program having the vulnerability.

Third Embodiment

Next, a third embodiment will be described. Incidentally, a configuration of the test system 40 according to the third embodiment is the same as that of the second embodiment, and thus, will not be described.

Figure 13:
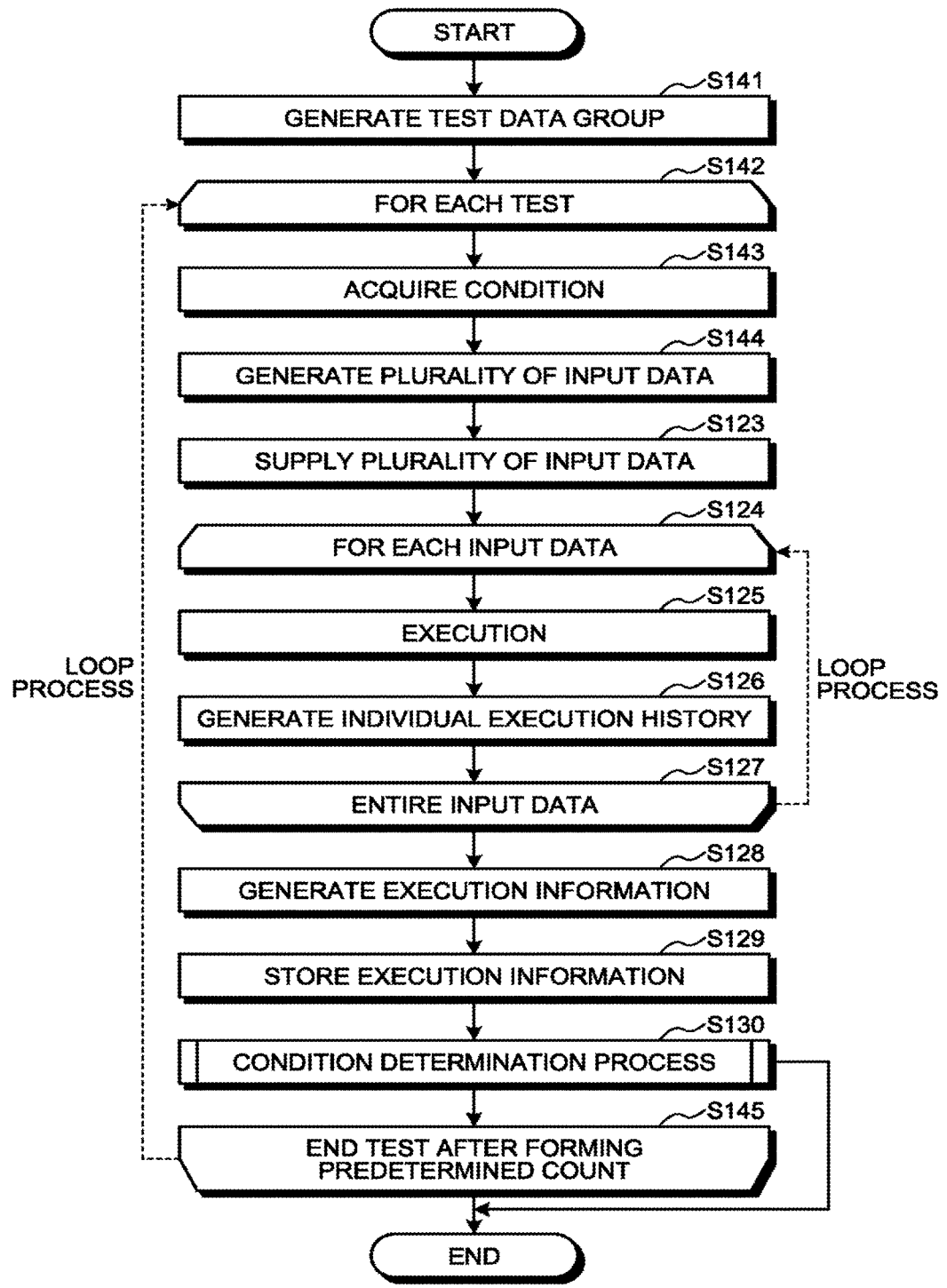
FIG. 13 is a diagram illustrating a processing flow of a test system according to a third embodiment.

FIG. 13 is a diagram illustrating a processing flow of the test system 40 according to the third embodiment. The test system 40 according to the present embodiment executes processing from S141, and tests the target device 50 a plurality of times.

First, the test data generator 71 generates the test data group which includes the plurality of test data in S141.

Subsequently, the test system 40 executes processes of S143, S144 and S123 to S130 for each test (a loop process between S142 and S145).

In S143, the input data generator 73 acquires a condition determined in the previous tests from the condition determination device 10. Incidentally, the input data generator 73 does not necessarily acquire the condition since the condition has not been determined by the condition determination device 10 yet in the first test.

Subsequently, the input data generator 73 generates a plurality of input data that satisfy the condition based on a test data group in S144. Incidentally, the input data generator 73 randomly extracts test data from the test data group and outputs the extracted test data as the input data in the first test.

In addition, the input data generator 73 extracts test data that satisfies the condition from the test data group and outputs the extracted test data as the input data in the second and subsequent tests. Further, the input data generator 73 extracts the plurality of input data that do not overlap the input data extracted in the previous tests in the second and subsequent tests. Accordingly, the input data generator 73 can eliminate the overlapping test.

When the process of S144 ends, the test system 40 executes the processes of S123 to S130. The processes of S123 to S130 are the same as those of the second embodiment, and thus, the detailed description thereof will be omitted.

After end of S130, the test system 40 determines whether tests of a predetermined count have ended in S145. When the tests of the predetermined count have not ended, the test system 40 returns the processing to S142, and repeats the processing for a subsequent test.

When the tests of the predetermined count have ended, the test system 40 ends the present flow. The test system 40 can forcibly end the processing by ending the flow when the tests of the predetermined count end in a case where the target device 50 does not execute the shortage component even if the input data generated following the condition is supplied, for example.

As described above, the test system 40 according to the present embodiment performs the test a plurality of times and generates the input data having a high possibility of enabling the target device 50 to execute the component of which the execution history has not satisfied the test criteria in each test. Accordingly, it is possible to further reduce the vulnerability of the program by causing the target device 50 to intensively execute the insufficiently tested component in the program using the test system 40 according to the present embodiment.

Incidentally, the execution information storage 86 may erase the execution information generated in the previous tests in the case of storing new execution information acquired in the current test in a state where the execution information generated in the previous tests has been stored in the third embodiment. In this case, the combining unit 22 generates a total execution history by combining a plurality of individual execution histories represented in the execution information which has been acquired in the current test. Further, the specifying unit 24 stores a specified shortage component for each test. Further, the specifying unit 24 specifies a component of which the total execution history has not satisfied the test criteria among the shortage components specified in the previous tests as the shortage component in the current test.

Accordingly, the execution information storage 86 does not necessarily leave the execution information for each test, and thus, can efficiently use the storage capacity. In addition, the specifying unit 24 does not newly specify the component that has already satisfied the test criteria as the shortage component, and thus, it is possible to efficiently perform the test.

In addition, the data supplier 74 may supply a plurality of input data to the target device 50 by adding a plurality of input data generated in the current test and a plurality of input data generated in the previous tests, which have been stored in the data storage 75, in the third embodiment. Accordingly, the execution information generator 82 can generate individual execution histories in the case of supplying the plurality of input data which have been generated in the entire test so far. Accordingly, the specifying unit 24 can specify a component of which an execution history does not satisfy the test criteria when the plurality of input data, generated in the entire test so far, are supplied to the target device 50.

Modified Example

Hereinafter, a modified example will be described.

In the second embodiment and the third embodiment, the test data generator 71 may add attribute information of test data to the test data. The attribute information is data indicating a property and a characteristic of the test data. In this case, the attribute information added to the test data is taken over also to input data generated by the input data generator 73. The condition determination device 10 may use the attribute information as one of parameters of the test data (input data) in the case of determining a condition. For example, when an identifier of the test data is set as the attribute information, the condition determination device 10 may include the identifier in the condition of the input data.

In the second embodiment and the third embodiment, the data supplier 74 may include time of supplying the input data to the target device 50 or a supply order, or both the time and the supply order in the attribute information in the case of supplying the input data to the target device 50. The execution history generator 82 may add time of generating the individual execution history or a generation order, or both the time and the generation order to the individual execution history. Accordingly, the execution information generator 85 can easily set the pair of the input data and the individual execution history.

In the second embodiment and the third embodiment, the execution history generator 82 may generate the total execution history for each test. In this case, the execution history generator 82 supplies the generated total execution history to the condition determination device 10. Accordingly, the condition determination device 10 can be configured without including the combining unit 22. In addition, the execution history generator 82 may generate information indicating presence or absence of execution for each component included in the program as the individual execution history in this case.

In the second embodiment and the third embodiment, the input data generator 73 may generate the input data to be irrelevant to the test data group. Accordingly, the input data generator 73 can generate the input data that is not present in the test data group.

In the first embodiment, the second embodiment, and the third embodiment, the individual execution history and the total execution history may include an execution count of a component, execution presence-or-absence of the component, an execution time of the component, a trace log taken for execution of each component, and the number of variations of input variables with respect to the component for each component included in the program. In addition, the test criteria are indicated by conditions using the execution count, the execution presence-or-absence, the execution time, the trace log and the number of variations of the input variables in this case.

In the first embodiment, the second embodiment, and the third embodiment, the individual execution history and the total execution history may use an identifier to identify a component in order to identify the component included in the program.

In the first embodiment, the second embodiment, and the third embodiment, the criteria storage 23 may store test criteria in advance or store test criteria to be input for each test, for example, by an operator. The criteria storage 23 can determine whether the test criteria have been satisfied without receiving input from the outside by storing the test criteria in advance. The criteria storage 23 can suitably change the test criteria for each test, for example, by storing the test criteria to be input for each test, for example, by the operator.

In the first embodiment, the second embodiment, and the third embodiment, the execution information may include an identifier that is allocated to input data instead of the actual input data. In this case, the classifying unit 25 and the condition determining unit 26 acquire a parameter of the input data or the like, for example, by referring to external storage (for example, the data storage 75 in the second embodiment and the third embodiment) which stores the input data. When the execution information includes the identifier, a size thereof is reduced.

In the first embodiment, the second embodiment, and the third embodiment, the specifying unit 24 may specify a component that is designated manually by the operator as the shortage component. Accordingly, the condition determining unit 26 can determine a condition of input data which causes execution of the component that the operator particularly desires to test.

In the first embodiment, the second embodiment, and the third embodiment, the executed-or-unexecuted data information may additionally include information relating to the input data generated by the operator. In addition, the classifying unit 25 may suitably add or remove a matter included in the executed-or-unexecuted data information in response to an operation of the operator. Accordingly, the condition determination device 10 can determine the condition with a higher accuracy.

In the first embodiment, the second embodiment, and the third embodiment, the condition determining unit 26 may receive a determination result on whether the determined condition is useful for a test from the operator or the like. When it is determined that the condition is not useful in a test, the condition determining unit 26 removes a part of or the entire condition determined not to be useful.

In the first embodiment, the second embodiment, and the third embodiment, the condition determining unit 26 may end a test when it is not possible to determine a condition.

In addition, the input data generator 73 may end a test when it is not possible to extract input data that satisfies a condition in the second embodiment and the third embodiment. For example, the input data generator 73 ends the test when any test data that satisfies the condition is not present at the time of removing the test data generated in the past from a test data group.

Hardware Configuration

Figure 14:
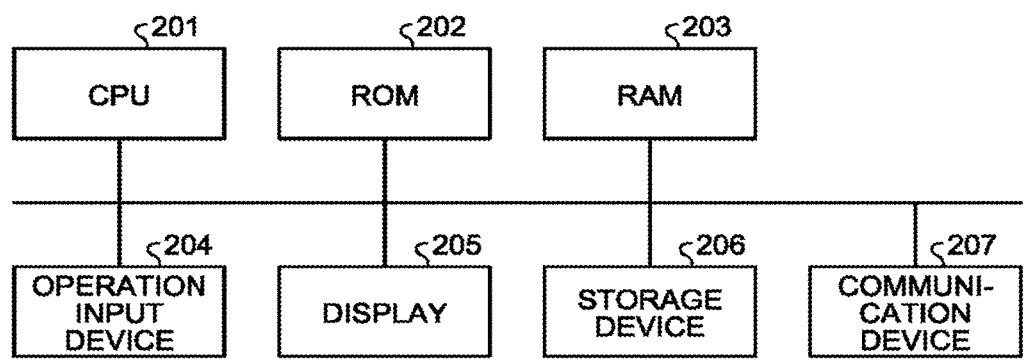
FIG. 14 is a diagram illustrating a hardware configuration of the condition determination device and the test device.

FIG. 14 is a diagram illustrating a hardware configuration of the condition determination device 10 and the test device 61.

The condition determination device 10 and the test device 61 according to the present embodiment are implemented using an information processing device having the hardware configuration as illustrated in FIG. 14, for example. This information processing device has the same configuration as a typical computer. That is, the information processing device includes a CPU (Central Processing Unit) 201, a ROM (Read Only Memory) 202, a RAM (Random Access Memory) 203, an operation input device 204, a display 205, a storage device 206, and a communication device 207. Further, the respective units are connected to one another via a bus.

The CPU 201 is a processor that executes a program stored in the ROM 202 and the storage device 206 by expanding the program in the RAM 203, and performs processing (control of each unit, processing of data, and the like) following the program. The CPU 201 executes various kinds of processing in cooperation with the program stored in the ROM 202, the storage device 206 and the like using a predetermined area of the RAM 203 as a work area.

The ROM 202 is a memory that stores the program and various kinds of information in a non-rewritable manner. A start program, which reads a program for activation of an operating system from the storage device 206 to the RAM 203, is stored in the ROM 202.

The RAM 203 is a memory such as an SDRAM (Synchronous Dynamic Random Access Memory). The RAM 203 stores data, which serves as a target to be processed by the CPU 201, and functions as the work area of the CPU 201.

The operation input device 204 is an input device such as a mouse and keyboard. The operation input device 204 receives information input by user's operation as an instruction signal and outputs the instruction signal to the CPU 201.

The display 205 is a display device such as an LCD (Liquid Crystal Display). The display 205 displays various kinds of information based on a display signal from the CPU 201.

The storage device 206 is, for example, a hard disk drive or a flash memory. The storage device 206 stores the operating system, an application program, and data. The communication device 207 is an interface device which is configured for connection with the network. The communication device 207 performs communication with an external device via the network according to control from the CPU 201.

The program executed by the information processing device according to the present embodiment is provided in the state of being recorded as a file in an installable format or in an executable format in a recording medium that is readable by a computer such as a CD-ROM, a flexible disk (FD), a CD-R, and a DVD. In addition, it may be configured such that the program executed by the information processing device according to the present embodiment is stored in a computer connected to the network such as the Internet and is provided through download via the network. In addition, it may be configured such that the program executed by the information processing device according to the present embodiment is provided or distributed via the network such as the Internet. In addition, it may be configured such that the program according to the present embodiment is provided in the state of being incorporated in the ROM 202 or the like in advance.

A data processing program, which is configured to cause the information processing device to function as the condition determination device 10, includes an acquiring module, a combining module, a specifying module, a classifying module, and a condition determining module. When the processor (the CPU 201) reads the program from a storage medium (such as the storage device 206) and executes the program in the information processing device, the respective modules are loaded on a main storage device (the RAM 203), and the processor (the CPU 201) functions as the acquiring unit 21, the combining unit 22, the specifying unit 24, the classifying unit 25, and the condition determining unit 26. In addition, the RAM 203 or the storage device 206 functions as the criteria storage 23. Incidentally, some or all of the acquiring unit 21, the combining unit 22, the specifying unit 24, the classifying unit 25, and the condition determining unit 26 may be implemented by hardware other than the processor.

A data processing program, which is configured to cause the information processing device to function as the test device 61, includes a test data generating module, an input data generating module, and a data supplying module. When the processor (the CPU 201) reads the program from the storage medium (such as the storage device 206) and executes the program in the information processing device, the respective modules are loaded on the main storage device (the RAM 203), and the processor (the CPU 201) functions as the test data generator 71, the input data generator 73, and the data supplier 74. In addition, the RAM 203 or the storage device 206 functions as the test data storage 72 and data storage 75. Incidentally, some or all of the test data generator 71, the input data generator 73, and the data supplier 74 may be implemented by hardware other than the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
one or more processors configured to:
acquire a total execution history, which is an execution count for each component included in a program, when a test is performed by supplying a plurality of input data to a target device which executes the program;
specify a shortage component of which the execution count indicated by the total execution history does not satisfy test criteria among a plurality of the components included in the program, the test criteria being a condition indicating a pass when the execution count is equal to or larger than a set value;
classify each of the plurality of input data into first data, which causes the target device to execute the shortage component, and second data, which does not cause the target device to execute the shortage component; and
determine a condition of input data having a common characteristic with the first data.

2. The information processing device according to claim 1, wherein the processors are further configured to:
acquire execution information that indicates a pair of input data and an individual execution history, which is an execution count for each component when the input data is supplied to the target device, for each of the plurality of input data; and
combine a plurality of individual execution histories indicated in the execution information and generate the total execution history.

3. The information processing device according to claim 2, wherein
the component included in the program is a statement.

4. The information processing device according to claim 1, wherein
the processors determine the condition of input data based on a relationship between the first data and the second data.

5. The information processing device according to claim 4, wherein
an attribute of the input data is represented by a plurality of parameters, and
the processors determine a boundary value between the first data and the second data for any of the parameters and determine the condition of input data regarding the parameter based on the boundary value of the parameters.

6. The information processing device according to claim 4, wherein
the processors determine the condition of input data by data mining.

7. The information processing device according to claim 1, wherein the processors are further configured to:
generate input data which satisfies the condition.

8. The information processing device according to claim 7, wherein
the processors generate the input data that does not overlap input data which is previously supplied to the target device.

9. The information processing device according to claim 1, wherein
the total execution history includes, for each component included in the program, the execution count and an execution presence-or-absence, and
the test criteria are a condition indicating a pass expressed by a condition using the execution count and the execution presence-or-absence.

10. The information processing device according to claim 1, wherein
the total execution history includes, for each component included in the program, the execution count and an execution time, and
the test criteria are a condition indicating a pass expressed by a condition using the execution count and the execution time.

11. The information processing device according to claim 1, wherein
the total execution history includes, for each component included in the program, the execution count and a trace log taken for execution of the component, and
the test criteria are a condition indicating a pass expressed by a condition using the execution count and the trace log.

12. The information processing device according to claim 1, wherein
the total execution history includes, for each component included in the program, the execution count and the number of variations of input variables with respect to the component, and
the test criteria are a condition indicating a pass expressed by a condition using the execution count and the number of variations.

13. A computer program product comprising a non-transitory computer-readable recording medium that stores therein a data processing program, wherein the program, when executed by a computer, causes the computer to perform:
acquiring a total execution history, which is an execution count for each component included in a program, when a test is performed by supplying a plurality of input data to a target device which executes the program;
specifying a shortage component of which the execution count indicated by the total execution history does not satisfy test criteria among a plurality of the components included in the program, the test criteria being a condition indicating a pass when the execution count is equal to or larger than a set value;
classifying each of the plurality of input data into first data, which causes the target device to execute the shortage component, and second data, which does not cause the target device to execute the shortage component; and
determining a condition of input data having a common characteristic with the first data.

14. A test system that tests a target device which executes a program, the test system comprising:

one or more processors configured to:

generate a plurality of input data;

supply the plurality of input data to the target device and perform a test;

acquire execution information that indicates a pair of the input data and an individual execution history, which is an execution count for each component included in the program when the input data is supplied to the target device, for each of the plurality of input data;

combine a plurality of the individual execution histories indicated in the execution information and generate a total execution history, which is an execution count for each component included in the program when a test is performed by supplying the plurality of input data to the target device;

specify a shortage component of which the execution count indicated by the total execution history does not satisfy test criteria among a plurality of the components included in the program, the test criteria being a condition indicating a pass when the execution count is equal to or larger than a set value;

classify each of the plurality of input data into first data, which causes the target device to execute the shortage component, and second data, which does not cause the target device to execute the shortage component; and determine a condition of input data having a common characteristic with the first data.

15. The test system according to claim 14, wherein the target device is tested a plurality of times, and the processors generate input data which satisfies the condition determined in a previous test, in second and subsequent tests.

16. The test system according to claim 15, further comprising test data storage configured to store a plurality of test data, wherein the processors extract the plurality of input data from a plurality of the test data in the respective tests and extract a plurality of input data, which does not overlap input data extracted in previous tests, in the second and subsequent tests.

17. The test system according to claim 16, wherein the processors combine the plurality of the individual execution histories, indicated in the execution information acquired in a current test, and generate the total execution history, and the processors specify the component of which the total execution history does not satisfy the test criteria among the shortage components specified in the previous tests as the shortage component in the current test.

18. The test system according to claim 16, wherein the processors supply the plurality of input data to the target device by adding a plurality of input data generated in a current test and a plurality of input data generated in the previous tests.

19. The test system according to claim 15, wherein the processors end the test when tests have been performed for a predetermined count.

20. A computer program product comprising a non-transitory computer-readable recording medium that stores therein a data processing program, where in the program, when executed by a computer, causes the computer to perform:

generating a plurality of input data;

supplying the plurality of input data to a target device and performing a test;

acquiring execution information that indicates a pair of the input data and an individual execution history, which is an execution count for each component included in the program when the input data is supplied to the target device, for each of the plurality of input data;

combining a plurality of the individual execution histories indicated in the execution information and generating a total execution history, which is an execution count for each component included in the program when a test is performed by supplying the plurality of input data to the target device;

specifying a shortage component of which the execution count indicated by the total execution history does not satisfy test criteria among a plurality of the components included in the program, the test criteria being a condition indicating a pass when the execution count is equal to or larger than a set value;

classifying each of the plurality of input data into first data, which causes the target device to execute the shortage component, and second data, which does not cause the target device to execute the shortage component; and determining a condition of input data having a common characteristic with the first data.

* * * * *